US009841730B2

(12) United States Patent
Yamaguchi et al.

(10) Patent No.: US 9,841,730 B2
(45) Date of Patent: Dec. 12, 2017

(54) FILTER FRAME AND FILTER ASSEMBLY

(71) Applicant: CANON KABUSHIKI KAISHA, Tokyo (JP)

(72) Inventors: Yoshimasu Yamaguchi, Kawasaki (JP); Kazuhisa Okuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/186,886

(22) Filed: Jun. 20, 2016

(65) Prior Publication Data

US 2016/0378057 A1    Dec. 29, 2016

(30) Foreign Application Priority Data

Jun. 24, 2015   (JP) ................................ 2015-126339

(51) Int. Cl.
*G03G 21/20*    (2006.01)
*B01D 46/00*    (2006.01)
*B01D 46/10*    (2006.01)

(52) U.S. Cl.
CPC ....... *G03G 21/206* (2013.01); *B01D 46/0005* (2013.01); *B01D 46/10* (2013.01); *G03G 2215/0132* (2013.01)

(58) Field of Classification Search
CPC .................................................... B01D 46/10
See application file for complete search history.

(56) References Cited

U.S. PATENT DOCUMENTS

| | | | | | |
|---|---|---|---|---|---|
| 2,074,294 | A | * | 3/1937 | Woodruff | B01D 46/10 55/493 |
| 3,881,250 | A | * | 5/1975 | Frederickson | B27B 17/00 30/383 |
| 3,929,648 | A | * | 12/1975 | Cuthbert | B01D 29/05 210/445 |
| 4,549,887 | A | * | 10/1985 | Joannou | B03C 3/14 55/493 |

(Continued)

FOREIGN PATENT DOCUMENTS

JP           10166853      *  6/1998
JP           H11-63597 A      3/1999
(Continued)

OTHER PUBLICATIONS

WIPO Translation of JP 10-166853 machine translated Dec. 20, 2016, all pages https://patentscope.wipo.int/search/en/detail.jsf?docId=JP65618673.*

*Primary Examiner* — Amber R Orlando
*Assistant Examiner* — Britanny Precht
(74) *Attorney, Agent, or Firm* — Fitzpatrick, Cella, Harper & Scinto

(57) ABSTRACT

A frame for sandwiching and holding a filter includes a first frame portion, a second frame portion, a plurality of first tapered projections, and a plurality of second tapered projections. At least the first tapered projections are disposed so as to be sandwiched by the second tapered projections with respect to an arrangement direction. Shapes, in a section in a plane perpendicular to the arrangement direction of at least one of the first tapered projections and the second tapered (Continued)

projections, of the at least one of the first tapered projections and the second tapered projections have first sides substantially perpendicular to a bottom thereof and second sides inclined with respect to the bottom.

10 Claims, 7 Drawing Sheets

(56) References Cited

U.S. PATENT DOCUMENTS

| | | | | |
|---|---|---|---|---|
| 4,610,705 | A * | 9/1986 | Sarnosky | B01D 39/1623 55/485 |
| 4,737,174 | A * | 4/1988 | Pontius | B01D 46/12 55/491 |
| 4,978,375 | A * | 12/1990 | Il Yoo | B01D 46/10 55/483 |
| 5,075,000 | A * | 12/1991 | Bernard | A47J 37/1223 210/167.28 |
| 5,464,461 | A * | 11/1995 | Whitson | B01D 46/0002 55/480 |
| 5,766,285 | A * | 6/1998 | Killman | B01D 46/0002 55/385.6 |
| 5,797,975 | A * | 8/1998 | Davis | B01D 46/0013 55/483 |
| 6,297,950 | B1 * | 10/2001 | Erwin | B01D 46/0005 361/679.49 |
| 6,652,748 | B1 * | 11/2003 | Choi | B01D 39/1607 210/232 |
| 6,843,820 | B2 * | 1/2005 | Kubokawa | B01D 46/0005 55/495 |
| 6,860,916 | B2 * | 3/2005 | Kubokawa | B01D 46/0005 55/357 |
| 6,955,702 | B2 * | 10/2005 | Kubokawa | B01D 46/0005 55/357 |
| 7,150,774 | B2 | 12/2006 | Kubokawa et al. | |
| 7,169,202 | B2 * | 1/2007 | Kubokawa | B01D 46/0016 55/487 |
| 8,142,537 | B2 * | 3/2012 | Braithwaite | B01D 46/10 55/497 |
| 8,721,754 | B2 * | 5/2014 | Mann | B01D 46/42 55/480 |
| 2003/0070406 | A1 * | 4/2003 | Duffy | B01D 29/031 55/497 |
| 2003/0230063 | A1 * | 12/2003 | Kubokawa | B01D 46/0005 55/497 |
| 2008/0184685 | A1 * | 8/2008 | Kempf | B01D 46/0005 55/497 |
| 2009/0199526 | A1 * | 8/2009 | Wallace | B01D 46/0004 55/493 |
| 2012/0204523 | A1 * | 8/2012 | Woolard | B01D 46/0005 55/357 |
| 2013/0000489 | A1 * | 1/2013 | Lu | B01D 46/0005 96/222 |
| 2015/0013287 | A1 * | 1/2015 | Yamaguchi | B01D 46/521 55/491 |

FOREIGN PATENT DOCUMENTS

| | | |
|---|---|---|
| JP | 2001-062232 A | 3/2001 |
| JP | 2007-516829 A | 6/2007 |
| JP | 2007-516830 A | 6/2007 |
| JP | 2015-016435 A | 1/2015 |

* cited by examiner (a)

(b)

(c)

FILTER FRAME AND FILTER ASSEMBLY

FIELD OF THE INVENTION AND RELATED ART

The present invention relates to a filter frame for being provided, while holding a filter, e.g., in a path where air supply into an image forming apparatus or air discharge to an outside of the image forming apparatus and relates to a filter assembly.

In the image forming apparatus, a plurality of electrical parts (components) such as a motor and a power (voltage) source substrate are mounted and heat is given off by these parts. For this reason, conventionally, the air supply into the image forming apparatus and the air discharge to the outside of the image forming apparatus have been made. Further, when dirt and dust accumulate in the image forming apparatus or when the dirt and the dust float in the air in the image forming apparatus by being raised, there is a possibility that they are deposited on a surface of a recording material such as a sheet (paper) and thus an image quality lowers. For this reason, conventionally, a constitution in which a filter is provided for dust collection in a path for air supply or air discharge by a fan has been known.

This filter is held (supported) by a filter frame for being provided to a duct constituting a path for air supply or air discharge. For example, a constitution for holding a pleated filter formed so as to be repetitively folded up has been proposed (e.g., Japanese Laid-Open Patent Application (JP-A) (Kohyo) 2007-516829. In the case of the constitution disclosed in JP-A 2007-516829, a base portion (frame portion) constituting a filter frame is provided with a plurality of lateral ribs, and folds (pleats) of the pleated filter are disposed so as to be engaged with the lateral ribs. Then, in this state, a cover (frame portion) is superposed on the base portion, so that the filter is held.

Further, also a constitution for holding a flat plate(-shaped) filter has been proposed (e.g., JP-A H(Hei)11-63597). In the case of the constitution disclosed in JP-A H11-63597, in a state in which the filter is mounted on one of frames (frame portions) constituting a filter frame, the other frame (frame portion) is superposed on the one of frames (frame portions), so that the filter is held. In these cases of the constitution disclosed in JP-A 2007-516829 and JP-A H11-63597, it would be considered that the filter is held by being sandwiched between edge portions of the frame portions which are superposed on each other.

However, in the cases of the constitutions disclosed in JP-A 2007-516829 and JP-A H11-63597, the filter is held by being sandwiched between the edge portions of the frame portions which are superposed on each other, and therefore, a filter retaining force is weak and thus there is a possibility that the filter passes through the edge portions and falls off. Further, in the case of the constitution disclosed in JP-A 2007-516829, the plurality of lateral ribs are provided on the base portion, and therefore, the filter retaining force with respect to a direction crossing the lateral ribs is high but the filter retaining force with respect to a direction along the lateral ribs is low. Further, the plurality of lateral ribs are provided, and therefore, an opening area becomes small. When the opening area is small, pressure loss of the air passing through the filter becomes large, so that efficiency lowers.

SUMMARY OF THE INVENTION

A principal object of the present invention is to provide a (filter) frame and a filter assembly which are capable of not only strengthening a filter holding force but also ensuring an opening area.

According to an aspect of the present invention, there is provided a frame for sandwiching and holding a filter, comprising: a first frame portion; a second frame portion configured to hold the filter between itself and the first frame; a plurality of first tapered projections configured to be provided on a surface of the first frame portion where the filter is mounted and configured to project from the surface of the first frame portion so as to be disposed with intervals at an edge portion of a region where the filter is disposed; and a plurality of second tapered projections configured to be provided on a surface of the second frame portion where the filter is mounted and configured to project from the surface of the second frame portion so as to be disposed with intervals at an edge portion of a region where the filter is disposed, wherein at least the first tapered projections are disposed so as to be sandwiched by the second tapered projections with respect to an arrangement direction, wherein shapes, in a section in a plane perpendicular to the arrangement direction of at least one of the first tapered projections and the second tapered projections, of the at least one of the first tapered projections and the second tapered projections have first sides substantially perpendicular to a bottom thereof and second sides inclined with respect to the bottom.

Further features of the present invention will become apparent from the following description of exemplary embodiments with reference to the attached drawings.

DESCRIPTION OF THE EMBODIMENTS

Figure 1:
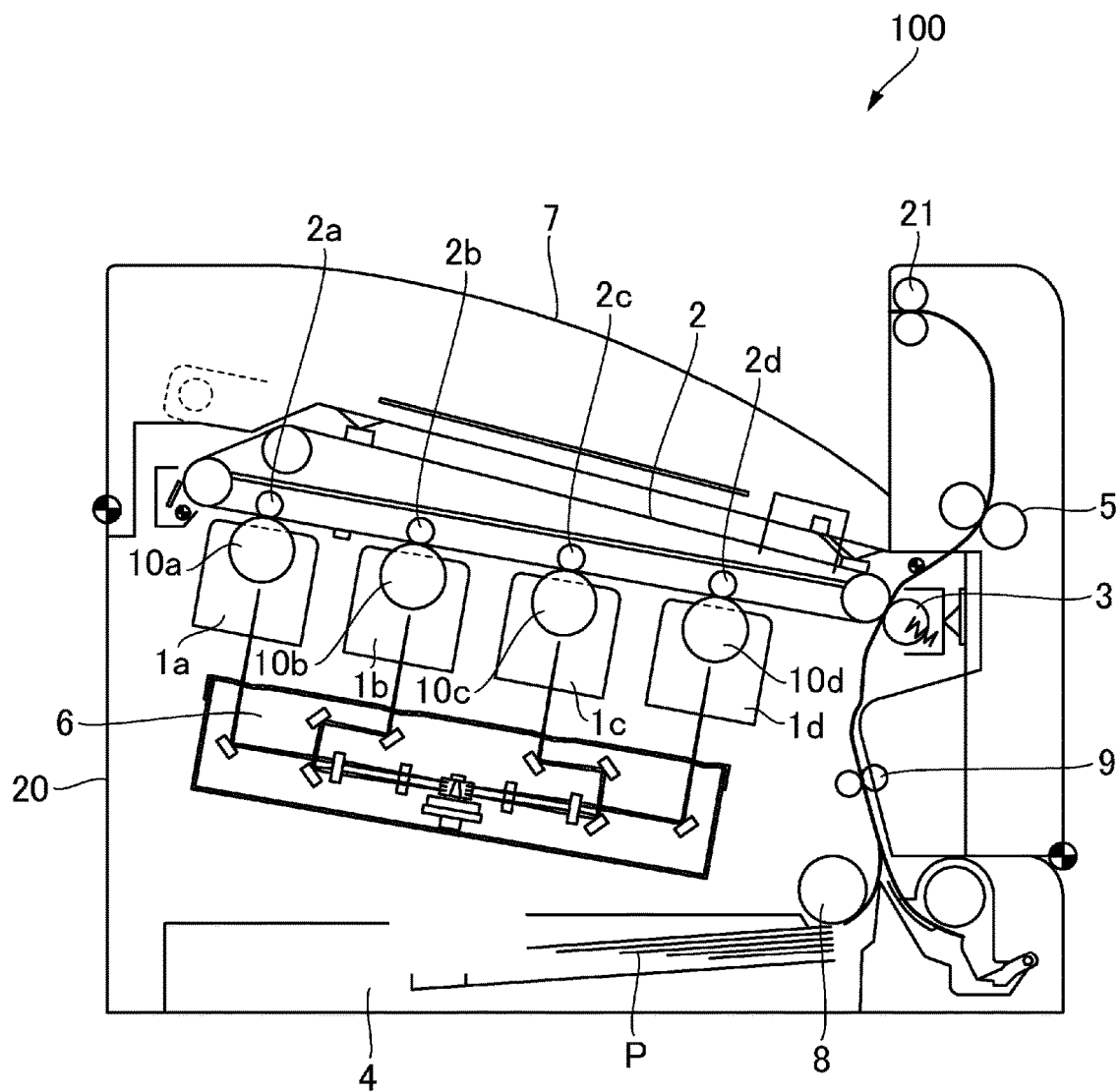
FIG. 1 is a schematic illustration of an image forming apparatus in an embodiment of the present invention.

An embodiment of the present invention will be described with reference to FIGS. 1 to 8. First, using FIG. 1, a general structure of an image forming apparatus in this embodiment will be described.

[Image Forming Apparatus]

In the image forming apparatus 100, four photosensitive drums 10a-10d for forming toner images of yellow, magenta, cyan and black, respectively, are provided. Further, at peripheral portions of these photosensitive drums 10a-10d, unshown chargers, developing devices and cleaners are provided and are assembled into units as process cartridges 1a-1d, respectively. On these process cartridges 1a-1d, an intermediary transfer belt 2 as an intermediary transfer member is provided in contact with the photosensitive drums 10a-10d.

The photosensitive drums 10a-10c are electrically charged by the unshown chargers, respectively, and are exposed by an exposure device 6 to light with optical images, of yellow, magenta, cyan and black, respectively, which are color-separated on the basis of image information. Thus, latent images of yellow, magenta, cyan and black are formed on the photosensitive drums 10a-10d, respectively. Then, the respective latent images are developed by the associated developing devices, so that toner images of yellow, magenta, cyan and black are formed on the photosensitive drums 10a-10d, respectively.

With rotation of the photosensitive drums 10a-10d, the toner images reach primary transfer positions where the photosensitive drums 10a-10d contact the intermediary transfer belt 2. The toner images are successively transferred onto the intermediary transfer belt 2 which is a moving image carrying member by primary transfer rollers 2a-2d provided opposed to the photosensitive drums 10a-10d, respectively. To each of the primary transfer rollers 2a-2d, a primary transfer bias is applied from an electrical substrate described later.

A sheet (sheet material such as paper or an OHP state) P as a recording material accommodated in a sheet feeding cassette 4 is fed one by one by a pick-up roller 8. Then, the sheet P is timed to the toner images by a registration roller pair 9 and thereafter is fed to a nip constituted by a secondary transfer 3 and the intermediary transfer belt 2, where the toner images are collectively transferred from the intermediary transfer belt 2 onto the sheet P.

Thereafter, the sheet P on which the toner images are transferred is fed to a fixing device 5, in which the respective color toners are melted and mixed under application of heat and pressure and then are fixed on the sheet P, so that a full-color print image is formed on the sheet P. The sheet P on which the toner images are fixed is discharged onto a discharge tray 7 by a discharging and feeding roller pair 21 provided downstream of the fixing device 5 with respect to a sheet feeding direction.

Arrangement of the above-described portions (members) in the image forming apparatus will be described. In the image forming apparatus 100, from a bottom of an apparatus main assembly 20, the feeding cassette 4, the exposure device 6, the process cartridges 1a-1d, the intermediary transfer belt 2, and the discharge tray 7 are provided in the listed order.

Incidentally, such an image forming apparatus 100 has multiple functions, and therefore, upsizing and speed-up of the image forming apparatus due to an increase in the number of constituent elements have progressed. Accordingly, in the apparatus main assembly 20 of the image forming apparatus 100, there is an increase in the amount of electrical parts (components) constituting a heat source, and thus, a temperature increases in the apparatus main assembly 20. For this reason, in order to suppress a temperature rise in the apparatus main assembly 20, the air in the apparatus main assembly 20 is required to be discharged more efficiently.

Further, due to speed-up of a printing speed of the image forming apparatus 100, vibration of the apparatus main assembly 20 becomes large, so that in addition to a contamination, due to an image forming process, such as toner powder raised in the air in the apparatus main assembly 20, also dirt and dust in an operation (use) environment increase proportionally to a cooling air volume (amount). For this reason, a dust collecting filter provided to an air-discharging duct is required to have a higher dust collecting efficiency. Further, such a dust collecting filter is required to be exchanged periodically in order to maintain the dust collecting efficiency and a dust discharging efficiency. Therefore, it is required that shortening of a maintenance time, minimization of downtime and a reduction in running costs are achieved by improving a mounting property of such a filter and a maintenance property of an exchanging (replacing) operation or the like.

[Filter]

Next, a filter 31 (FIG. 4 or the like) to be provided in an air-supplying or air-discharging path of the image forming apparatus 100 will be described. The filter 31 in this embodiment is a fibrous nonwoven fabric formed in a flat plate shape. The nonwoven fabric is prepared by assembling fibers in a sheet shape, and therefore, is weak is external force (strength) and is thus deformed. In the case where the filter 31 is used as an air filter, ease of passage of the air through the nonwoven fabric has a large influence on the air-discharging efficiency. On the other hand, the filter 31 is required to have a certain proper density so that dust articles which are an object to be collected are held in gaps of fibers of the nonwoven fabric. In the case where this density is unstable, the unstable density leads to unstable factors in terms of an air volume of a discharging fan, pressure loss of the filter 31, a collecting efficiency, a lifetime of the filter 31, and so on, and therefore has a large influence on the entirety of the image forming apparatus.

For this reason, the filter 31 is subjected to a special process for the purpose of preventing fraying of the fibers while maintaining a shape thereof. That is, a fixing method for preventing a change in position of the fibers by mutual shift of the fibers at a portion where the fibers microscopically constituting the nonwoven fabric contact each other is used. As the fixing method, for example, thermal bonding, chemical bonding, needle punching, stitch bonding, a water stream confounding method or the like may be used. In the thermal bonding, a heated air is blown to the fibers and thus contact portions of the fibers are welded to each other. In the chemical bonding, an adhesive is sprayed to the fibers and thus the fibers are bonded to each other. In the needle punching, a needle is moved at high speed and thus the fibers are confounded (entangled) with each other. In the stitch bonding, the fibers are stitched (sewed) by filaments which are long single fibers. In the water stream confounding method, the fibers are confounded by water pressure.

[Filter Frame]

Next, a filter frame 40 and a filter assembly 30 in this embodiment will be described using FIGS. 2 to 6. The filter frame 40 is used for holding the filter 31 as described above, and constitutes the filter assembly 30 in a state in which the filter 31 is held in the filter frame 40.

Figure 2:
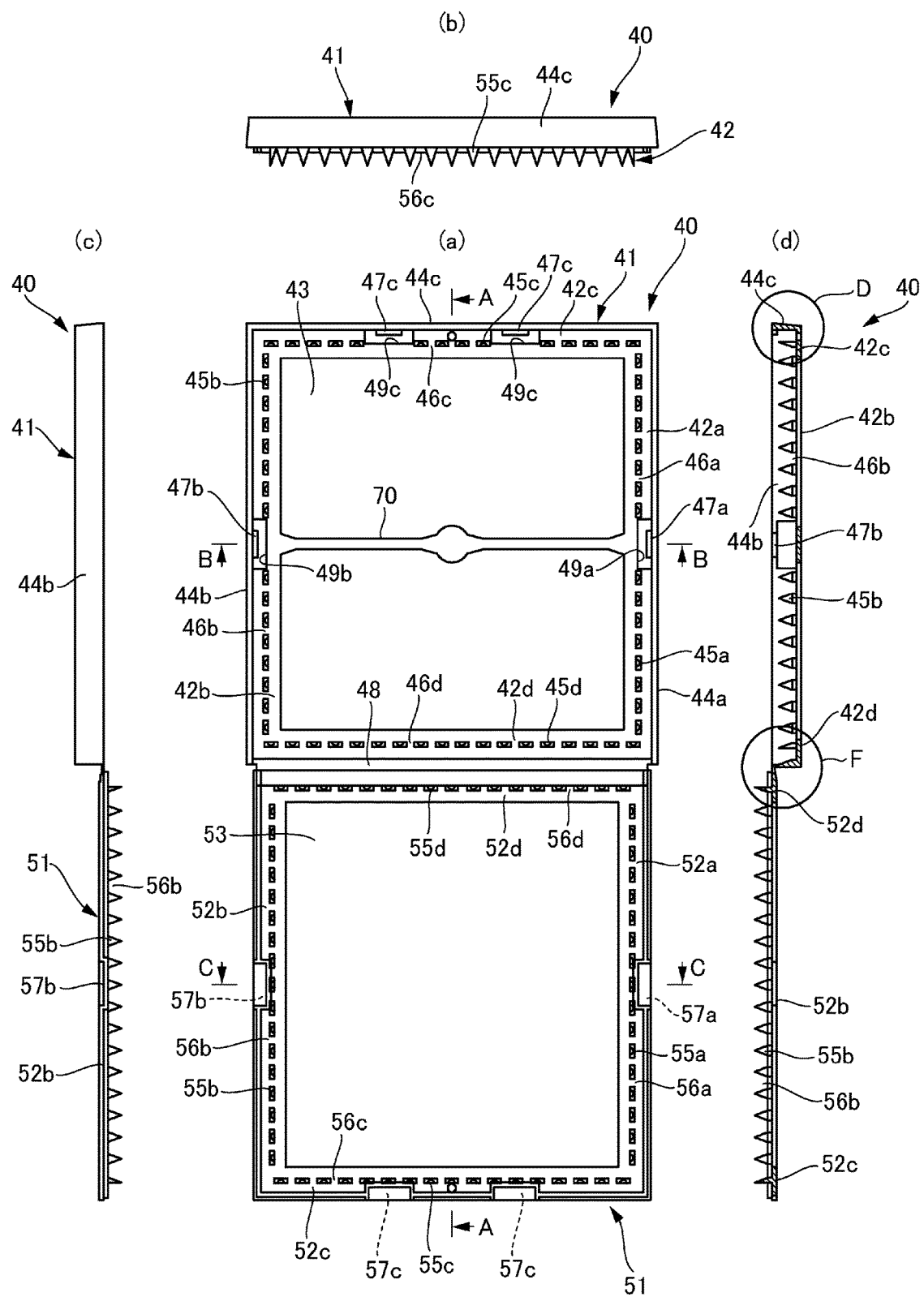
In FIG. 2, (a) to (d) are schematic views showing a filter frame in the embodiment, in which (a) is a plan view, (b) is a side view of the filter frame as seen from above the filter frame of (a), (c) is a side view of the filter frame as seen from a left side of the filter frame of (a), and (d) is a sectional view of the filter frame taken along A-A line of (a).
Figure 3:
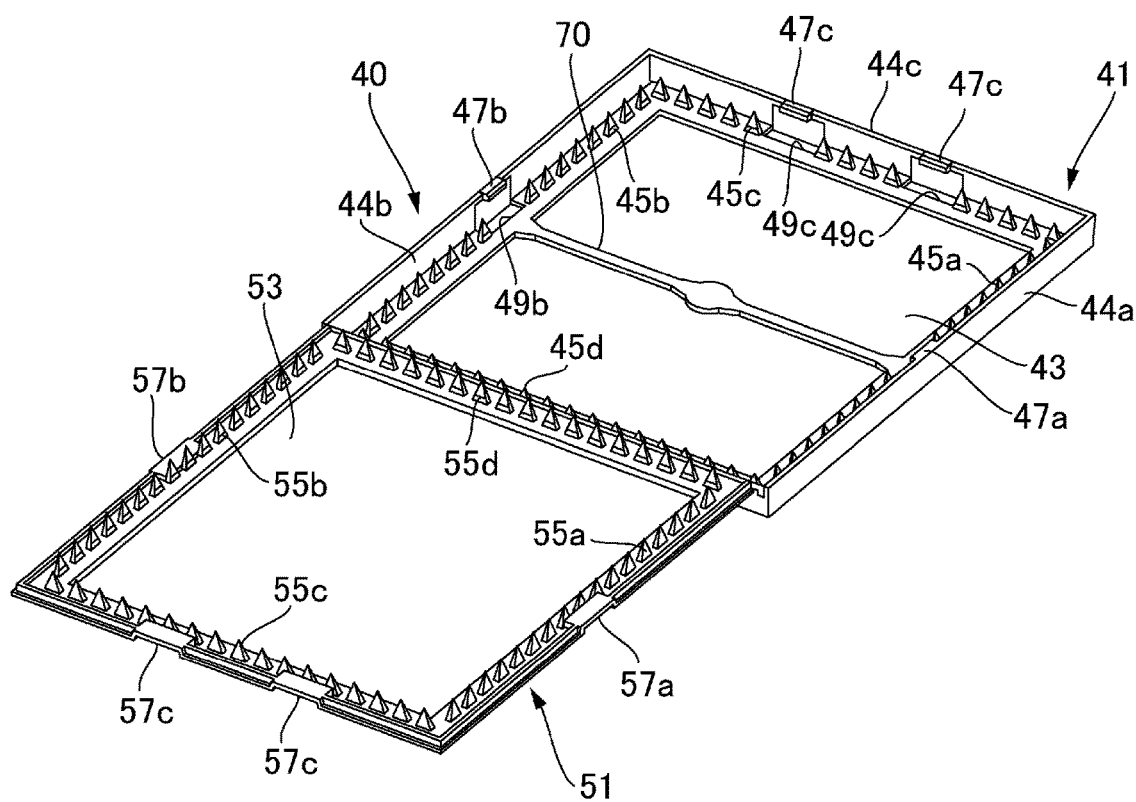
FIG. 3 is a perspective view of the filter frame in the embodiment.

The filter frame 40 includes a first frame portion 41 and a second frame portion 51 as shown in (a) to (d) of FIG. 2 and FIG. 3. As a material of the filter frame 40 constituted by the first frame portion 41 and the second frame portion 51, a plastic (resin) material such as polypropylene or polyamide may suitably be used. In this embodiment, the first frame portion 41 and the second frame portion 51 are integrally formed using the plastic material.

Each of the first frame portion 41 and the second frame portion 51 is formed in a substantially rectangular shape.

Figure 4:
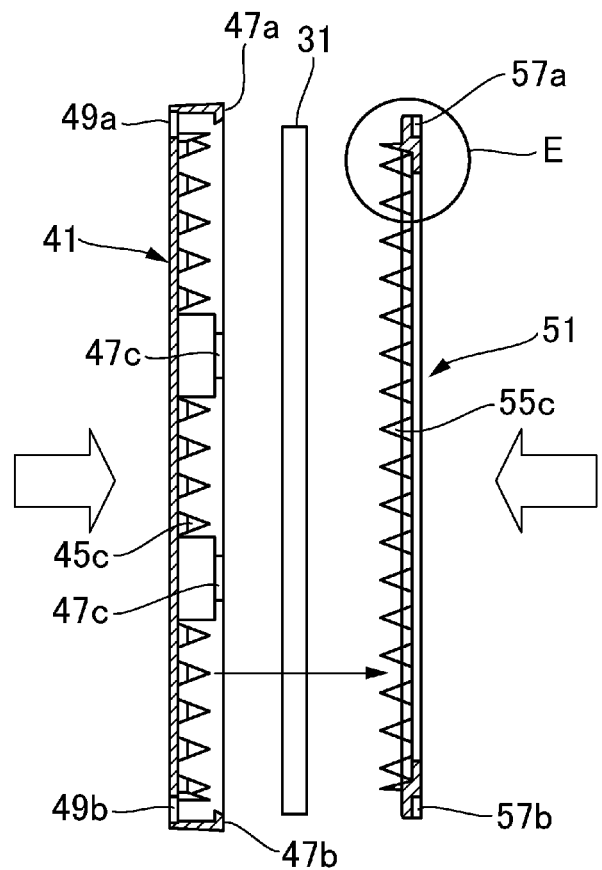
FIG. 4 is a sectional view showing a state in which a first frame portion along B-B cross-section of (a) of FIG. 2 and a second frame portion along C-C cross-section of (a) of FIG. 2 are opposed to each other while sandwiching a filter therebetween.
Figure 6:
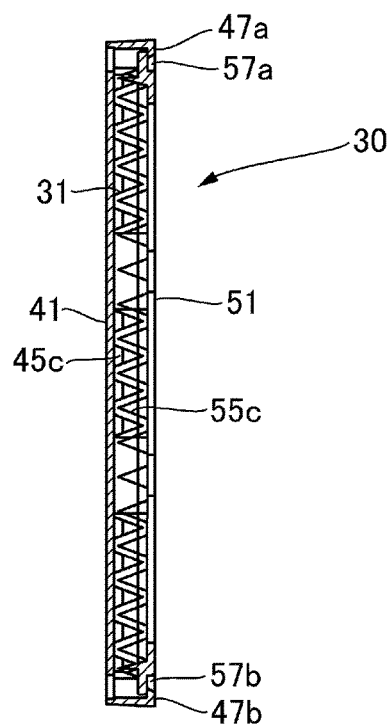
FIG. 6 is a sectional view of a filter assembly in the embodiment.

Further, peripheral four sides of the first frame portion 41 are constituted flat plate portions 42a, 42b, 42c and 42d, and peripheral four sides of the second frame portion 51 is constituted by flat plate portions 52a, 52b, 52c and 52d. The flat plate portions 42a-42d of the first frame portion 41 and the flat plate portions 52a-52d of the second frame portion 51 are disposed so as to surround spaces 43 and 53, respectively. As shown in FIGS. 4 and 6, these flat plate portions 42a-42d and 52a-52d are disposed so as to oppose each other in a state in which the second frame portion is folded up relative to the first frame portion 41 in order to sandwich the filter 31 between the first and second frame portions 41 and 51.

At outer peripheral edge portions of the flat plate portions 42a-42c, of the flat plate portions 42a-42d of the first frame portion 41, other than the flat plate portion 42d connected with the second frame portion 41 as described later, wall portions 44a-44c are provided to stand substantially vertically relative to the flat plate portions 42a-42c, respectively. A direction in which the wall portions 44a-44c are provided to stand in a direction in which the wall portions 44a-44c face the second frame portion 51 in a state in which the second frame portion 51 is folded up relative to the first frame portion 41 (i.e., in a state in which the first frame portion 41 is combined with the second frame portion 51 so as to sandwich the filter 31). In a state in which the first frame portion 41 and the second frame portion 51 are superposed on each other, the wall portions 44a-44c are positioned at a periphery of the flat plate portions 52a, 52b and 52c of the second frame portion 51. In other words, the outer peripheral edge portions of the flat plate portions 52a, 52b and 52c of the second frame portion 51 are capable of entering an inside of inside surfaces of the wall portions 44a-44c, respectively.

The first frame portion 41 and the second frame portion 51 are connected with each other by the flat plate portion 42d as shown in (a), (c) and (d) of FIG. 2 and FIG. 3. Further, the first frame portion 41 and the second frame portion 51 are rotatable relative to each other. Further, these portions are rotated so as to sandwich the filter 31 as shown in FIG. 4, so that the filter 31 is sandwiched and held between the first frame portion 41 and the second frame portion 51 as shown in FIG. 6. A detailed constitution of this portion will be described later.

[Projections]

As described above, each of the first frame portion 41 and the second frame portion 51 is formed in a substantially rectangular shape, and each of a plurality of first projections 45a-45d and a plurality of second projections 55a-55d is formed at peripheral edge portions in four sides. This will be specifically described below.

The first frame portion 41 includes the plurality of first projections 45a-45d. The plurality of first projections 45a-45d are arranged with intervals at edge portions in a region where the filter 31 is disposed and project toward the second frame portion 51 in a state in which the first frame portion 41 is combined with the second frame portion 51 so as to sandwich the filter 31. That is, pluralities of first projections 45a-45d are integrally formed so as to project from the flat plate portions 42a-42d provided at the peripheral edges of the first frame portion 41. Specifically, the flat plate portion 42a is provided with the plurality of first projections 45a linearly arranged with intervals along a longitudinal direction of the flat plate portion 42a. Similarly, the flat plate portions 42b, 42c and 42d are provided with the plurality of first projections 45b, the plurality of first projections 45c and the plurality of first projections 45d, respectively, linearly arranged with intervals along longitudinal directions thereof, respectively.

The second frame portion 51 includes the plurality of second projections 55a-55d. The plurality of second projections 55a-55d are arranged with intervals at edge portions in a region where the filter 31 is disposed and project toward the second frame portion 41 in a state in which the second frame portion 51 is combined with the first frame portion 41 so as to sandwich the filter 31. The plurality of second projections 55a-55d are positioned between the plurality of projections 45a-45d with respect to arrangement directions. That is, pluralities of second projections 55a-55d are integrally formed so as to project from the flat plate portions 52a-52d provided at the peripheral edges of the second frame portion 51. Specifically, the flat plate portion 52a is provided with the plurality of second projections 55a linearly arranged with intervals along a longitudinal direction of the flat plate portion 52a. Similarly, the flat plate portions 52b, 52c and 52d are provided with the plurality of second projections 55b, the plurality of second projections 55c and the plurality of second projections 55d, respectively, linearly arranged with intervals along longitudinal directions thereof, respectively.

For this reason, first gaps (intervals) 46a-46d are formed between the pluralities of first projections 45a-45, respectively, and second gaps (intervals) 56a-56d are formed between the pluralities of second projections 55a-55d, respectively. Further, in a state in which the first frame portion 41 and the second frame portion 51 are combined with each other so as to sandwich the filter 31, the pluralities of first projections 45a-45d and the pluralities of second projections 55a-55d are positioned in the second gaps 56a-56d and the first gaps 46a-46d, respectively. As a result, the pluralities of second projections 55a-55d are positioned between the pluralities of first projections 45a-45d, respectively. Further, the pluralities of first projections 45a-45d and the pluralities of second projections 55a-55d are alternately disposed with respect to the arrangement direction in a state in which the first frame portion 41 and the second frame portion 51 are combined so as to sandwich the filter 31.

Incidentally, as described later, at portions where engaging claws 47a, 47b and 47c provided on the wall portions 44a, 44b and 44c, respectively, of the first frame portion 41 are provided, the pluralities of first projections 45a, 45b and 45c are not provided. Further, at these portions, gaps (intervals) larger than the first gaps 46a, 46b and 46c, respectively, are provided. Further, in these gaps, the pluralities of second projections 55a-55d are positioned, respectively, but the pluralities of second projections 55a-55d positioned in these gaps and the pluralities of first projections 45a-45d are not alternately disposed. However, at such portions, the first projections may also be provided so that they are alternately disposed with the second projections. In this embodiment, the pluralities of first projections 45a-45d and the pluralities of second projections 55a-55d may only be required so that the first projections and the second projections are alternately disposed at positions, with respect to the arrangement direction, other than one of a plurality of positions where they are not alternately disposed.

The pluralities of first projections 45a-45d and the pluralities of second projections 55a-55d are, as shown in (b) to (d) of FIG. 2, FIG. 3 and FIG. 4, formed so that both side surfaces of each of the pluralities of first and second projections approach an associated side surface toward its free end. That is, each projection is formed in a substantially triangular shape. At least a free end portion of each projection of the pluralities of first and second projections 45a-45d and 55a-55d is formed so that a thickness with respect to a widthwise direction perpendicular to the arrangement direction narrows toward its free end. In other words, outside and inside side surfaces of the first frame portion 41 and the second frame portion 51 approach each other toward free ends. In addition, with respect to the widthwise direction perpendicular to the arrangement direction, the side surface positioned in the outside of the filter frame 40 has an angle, relative to a projection direction of the free end portion, smaller than the side surface positioned in the inside of the filter frame 40. In other words, the angle of the outside side surface relative to the projection direction is smaller than the angle of the inside side surface relative to the projection direction. These pluralities of first projections 45a-45d and pluralities of second projections 55a-55d have substantially the same shape. For this reason, as a representative, the first projection 45c will be described using (a) of FIG. 5. Incidentally, the outside of the first frame portion 41 refers to an outside relative to the space 43, and the inside of the first frame portion 41 refers to a space 43 side. Further, the outside of the second frame portion 51 refers to an outside relative to the space 53, and the inside of the second frame portion 51 refers to a space 53 side.

Each first projection 45c is constituted by a base portion 61 and a free end portion 62. The base portion 61 is formed integrally with the flat plate portion 42c, and an interval between the outside and inside side surfaces is substantially the same. The free end portion 62 is a portion extended further in the projection position relative to the base portion 61 and is inclined so that an inside side surface 62a approaches an outside side surface 62b with a position closer to the free end of the projection 45c. In this embodiment, the outside side surface is a surface substantially perpendicular to the flat plate portion 42c along the side surface in the outside of the base portion 61. On the other hand, the inside side surface 62a is a gently inclined surface which inclines toward the inside of the projection 45c from the side surface on the inside of the base portion 61 toward the free end of the projection 45c. Accordingly, the angle of the outside side surface 62b with respect to the projection direction is smaller than the angle of the inside side surface 62a with respect to the projection direction. In other words, the inside side surface 62a is inclined relative to the projection direction in a degree larger than the outside side surface 62b.

[Hinge Portion]

Next, a hinge portion 48 for rotatably fixing the first frame portion 41 and the second frame portion 51 will be described. The hinge portion 48 rotatably fixes the flat plate portion 42d which is a part of the first frame portion 41 to the flat plate portion 52d which is a part of the second frame portion 51. As described above, the first frame portion 41 and the second frame portion 51 are integrally formed using the plastic (resin) material. Further, as specifically shown in (c) of FIG. 5, a portion connecting the first frame portion 41 and the second frame portion is formed in a small thickness so as to have flexibility, so that this portion is the hinge portion 48.

[Holding Structure]

A holding structure for holding the first frame portion 41 and the second frame portion 51 in a superposed state will be described. In this embodiment, as shown in (a) of FIG. 2 and FIG. 3, the first frame portion 41 is provided with the engaging claws 47a-47c and the second frame portion 51 is provided with cut-away portions 57a-57c as engaging portions with which the engaging claws 47a-47c are engageable, respectively. A single engaging claw 47a and a single engaging claw 47b are formed on the wall portions 44a and 44b, respectively, of the first frame portion 41 so that each engaging claw projects from a free end toward the inside of an associated wall portion at a longitudinal central portion of the wall portion. Two engaging claws 47c are formed on the wall portion 44c of the first frame portion 41 so as to project from a free end toward the inside of the wall portion 44c at two positions sandwiching a longitudinal central portion of the wall portion 44c.

The portions of the engaging claws 47a, 47b and 47c of the wall portions 44a, 44b and 44c are formed so as to become thin toward a base end as shown in FIGS. 3 and 4. As a result, when the engaging claws 47a, 47b and 47c are engaged with or disengaged from the cut-away portions 57a, 57b and 57c, respectively, an operation of engagement and disengagement between these portions is facilitated by elastically deforming the thin portions. Further, at positions of the flat plate portions 42a, 42b and 42c opposing the engaging claws 47a, 47b and 47c, respectively, through holes 49a, 49b and 49c are formed, respectively, so that as described later, when the engaging claws 47a, 47b and 47c are formed using metal molds, the metal molds are disengaged through the through holes 49a, 49b and 49c.

As described above, the two engaging claws 47a and 47b are at least provided at two side peripheral edge portions, respectively, each continuous to an associated one of both ends of a one side peripheral edge portion where the hinge portion 48 is formed. That is, the two engaging claws 47a and 47b are provided on the wall portions 44a and 44b, respectively, of the flat plate portions 42a and 42b continuous to both ends of the flat plate portion 42d where the hinge portion 48 is formed. In this embodiment, as shown in (a) of FIG. 2 and FIG. 3, a connecting portion 70 for connecting the flat plate portions 42a and 42b so as to connect the portions where the engaging claws 47a and 47b of the flat plate portions 42a and 42b are provided. As a result, as described later, when the second frame portion 51 is opened relative to the first frame portion 41 in order to remove (demount) the filter 31, the engaging claws 47a and 47b are easily disengaged from the cut-away portions 57a and 57b, described below, in interrelation with each other via the connecting portion 70.

The cut-away portions 57a and 57b are formed in positions where the cut-away portions 57a and 57b engage with the engaging claws 47a and 47b, respectively, in a state in which the first frame portion 41 and the second frame portion 51 are superposed on each other. The cut-away portions 57a and 57b are formed so as to cut away parts of back surfaces of the flat plate portions 52a and 52b, as shown in FIG. 4 and (b) of FIG. 5. That is, the two cut-away portions 57a and 57b are formed so as to cut away the surfaces (back surfaces), opposite from the second projections 55a and 55b, from longitudinal central edge portions of the flat plate portions 52a and 52b of the second frame portion 51. The two cut-away portions 57c are formed at positions where the two cut-away portions 57c engage with the two engaging claws 47c in the state in which the first frame portion 41 and the second frame portion 51 are superposed on each other. Theses cut-away portions 57c are formed so as to cut away surfaces (back surfaces), opposite from the second projections 55c, from two longitudinal central edge portions of the flat plate portion 52c. The shape of the cut-away portions 57c is the same as those of the cut-away portions 57a and 57b.

Incidentally, in the above-described explanation, the engaging claws are formed on the first frame portion 41 and the cut-away portions as engaging portions are formed on the second frame portion 51, but the engaging claws may also be formed on the second frame portion 51 and the engaging portions may also be formed on the first frame portion 41. Or, the engaging claws and the cut-away portions may also be formed on each of the first and second frame portions. That is, it is only required that of the first frame portion 41 and the second frame portion 51, at least one of these frame portions is provided with the engaging claws and the other frame portion (and/or the one frame portion) is provided with the engaging portions.

[Holding of Filter]

Next, an operation for sandwiching and holding the filter 31 by the filter frame 40 having the above-described constitution will be described. First, in a state in which the filter 31 is sandwiched, the first frame portion 41 and the second frame portion 51 are rotated about the hinge portion 48, so that the first frame portion 41 and the second frame portion 51 are moved near to each other as shown by two opposing arrows in FIG. 4. Then, the peripheral edge portion of the filter 31 is sandwiched between the first and second frame portions 41 and 51 so that the filter 31 is accommodated inside the wall portions 44a-44d of the first frame portion 41 and so that the filter 31 is sandwiched in the gaps of the pluralities of first projections 45a-45d and the pluralities of second projections 55a-55d while being pressed so as to become wavy.

Then, as shown in FIG. 6, the first frame portion 41 and the second frame portion 51 are superposed on each other, so that the engaging claws 47a-47c are engaged with the cut-away portions 57a-57c, respectively. At this time, the engaging claws 47a-47c are elastically deformed toward the outside while being engaged with the edge portions of the flat plate portions 52a-52c, respectively, and then run over the edge portions and are elastically restored to original states, so that the engaging claws 47a-47c are engaged with the cut-away portions 57a-57c, respectively. As a result, during the engagement, the first frame portion 41 and the second frame portion 51 are connected to hold the filter 31 in a state in which the filter 31 is sandwiched therebetween. At this time, the first frame portion 41 and the second frame portion 51 are engaged with each other at peripheral edge portions other than the peripheral edge portion where the hinge portion 48 is formed, and therefore, a holding (retaining) force for holding (retaining) the filter 31 can be ensured. In this manner, the filter 31 is held in the sandwiched state by the filter frame 40, so that the filter assembly 30 as shown in FIG. 7 is obtained.

Figure 7:
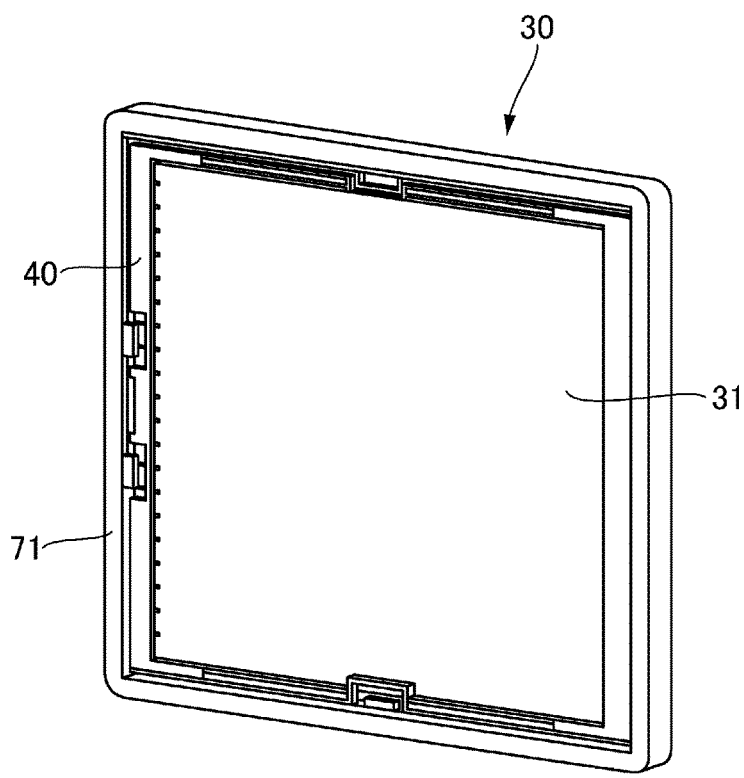
FIG. 7 is a perspective view showing the filter assembly in a state in which a gap-filling member is provided at an outer peripheral surface of the filter assembly.

In this embodiment, as shown in FIG. 7, at outer peripheral surfaces of the first frame portion 41 and the second frame portion 51 in a state in which the filter 31 is sandwiched therebetween, i.e., at an outer peripheral surface of the filter frame 40, a gap-filling member 71 as an elastic member is mounted. The gap-filling member 71 is formed in a substantially rectangular shape with a sponge and is bonded to the outer peripheral surface of the filter frame 40, i.e., the outer peripheral surfaces of the wall portions 44a-44c and the hinge portion 48 in the first frame portion 41 side, using a double-side adhesive tape or the like.

[Mounting of Filter Assembly]

Figure 8:
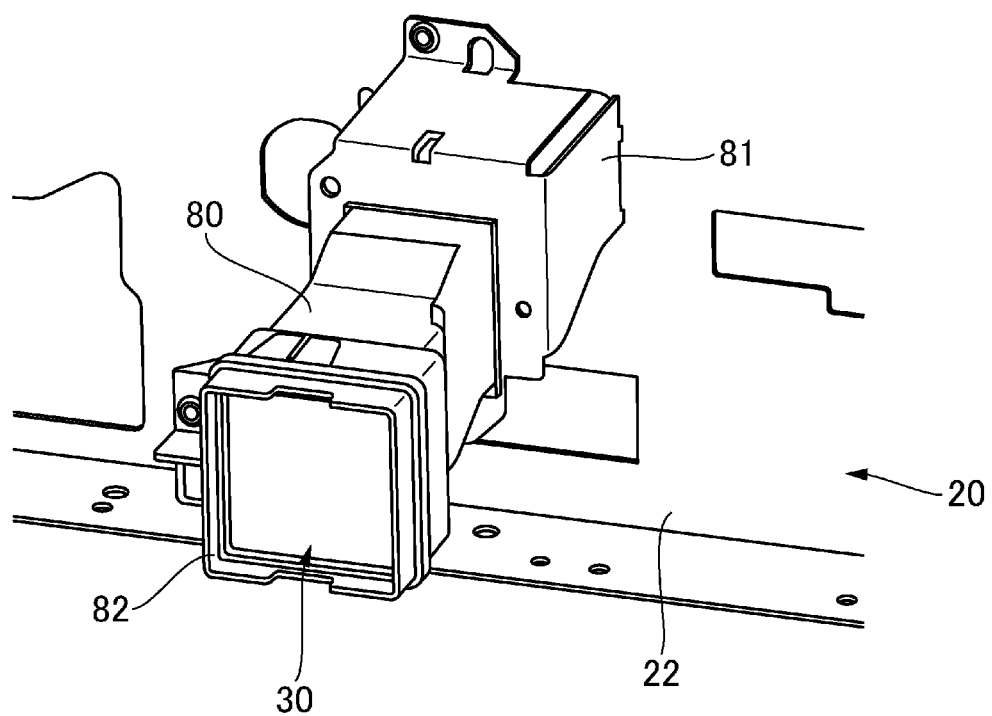
FIG. 8 is a perspective view showing the filter assembly in a state in which the filter assembly is mounted to a duct of the image forming apparatus.

Next, an operation for mounting the filter assembly 30, constituted as described above, to an air-discharging duct 80 provided in the apparatus main assembly 20 of the image forming apparatus 100 as shown in FIG. 8 will be described. The air-discharging duct 80 is fixed to a side plate 22 of the apparatus main assembly 20 via a duct supporting plate 81. Further, the air-discharging duct 80 is provided with a substantially rectangular filter case 82, and the filter assembly 30 is disposed in the filter case 82.

Specifically, as described above, in the state in which the filter 31 is held by the filter frame 40, the gap-filling member 71 formed of a soft material such as sponge is mounted at a periphery of the filter frame 40, so that the filter assembly 30 is prepared. In this state, the filter assembly 30 is engaged in the filter case 82. As a result, a gap between the filter frame 40 and the filter case 82 is filled by the gap-filling member 71, so that dirt and dust are prevented from leaking out through the gap.

[Exchange of Filter]

Next, an operation when the filter 31, which collects the dust (dirt) by being provided and used in the air-discharging duct 80 and which is contaminated with the dust, is exchanged (replaced) will be described. When the filter 31 is exchanged, in reverse manner to the manner during the above-described mounting, the filter assembly 30 disposed inside the filter case 82 is demounted from the filter case 82. Then, the filter frame 40 is opened, and the used filter 31 is taken out of the filter frame 40. At this time, a force is applied to the filter frame 40 so as to flex (bend) the wall portions 44a and 44b of the first frame portion 41 without peeling the gap-filling member 71. For example, of the wall portions 44a and 44b, the force is applied to the filter frame 40 so as to press the thin portions where the engaging claws 47a and 47b are formed or neighborhoods of the thin portions.

Here, as described above, the connecting portion 70 for connecting the flat plate portions 42a and 42b on which the wall portions 44a and 44b are provided, respectively, is provided so as to connect the portions where the engaging claws 47a and 47b are provided. For this reason, as described above, when the force is applied so as to flex (bend) the wall portions 44a and 44b, the wall portions 44a and 44b are flexed (bent) in a direction of spacing the engaging claws 47a and 47b from each other with the connecting portion 70 as a starting point. As a result, the engaging claws 47a and 47b are disengaged from the cut-away portions 57a and 57b, respectively.

Then, the second frame portion 51 is rotated with the hinge portion 48 as a starting point with respect to a direction in which the second frame portion 51 is opened relative to the first frame portion 41. At this time, for example, the second frame portion 51 is rotationally raised in an open direction with fingers of an operator (user) and thus the flat plate portion 52c is flexed (bent), so that the cut-away portion 57c provided in the flat plate portion 52c is inclined and thus the engaging claw 47c engaging with the cut-away portion 57c is raised. By further opening the second frame portion 51, the engaging claw 47c gradually runs over the cut-away portion 57c, so that the engagement between the engaging claw 47c and the cut-away portion 57c is eliminated. As a result, the filter frame 40 is in an open state as shown in FIG. 3.

Then, as described above, the used filter 31 is taken out of the filter frame 40. Thereafter, a new (fresh) filter 31 is mounted in the filter frame 40, and then the filter frame 40 is closed, so that the filter 31 is held in the filter frame 40 as described above. At this time, the gap-filling member 71 has been still mounted at the outer peripheral surface, i.e., the outer peripheral surfaces of the wall portions 44a-44d and the hinge portion 48. Thus, the filter assembly 30 in which the filter 31 is mounted again in the filter case 82 of the air-discharging duct 80 in the above-described manner.

As described above, in this embodiment, by flexing the first frame portion 41, the engagement of the engaging claws 47a and 47b is eliminated in interrelation with the flexure of the first frame portion 41, and by flexing the second frame portion 51, the engaging claw 47c is disengaged. For example, an operation such that the flat plate portion 52c of the second frame portion 51 is pulled in a state in which the wall portions 44a and 44b of the first frame portion 41 are held by the second frame portion 51 so as to be sandwiched by the second frame portion 51 is performed. Then, each of the wall portions 44a and 44b and the flat plate portion 52e is flexed, so that all of the engaging claws 47a-47c are disengaged substantially at the same time. For this reason, there is no need to perform an operation for separately disengaging the engaging claws 47a-47c, so that the contaminated filter 31 can be demounted and exchanged simply in a short time.

Figure 5:
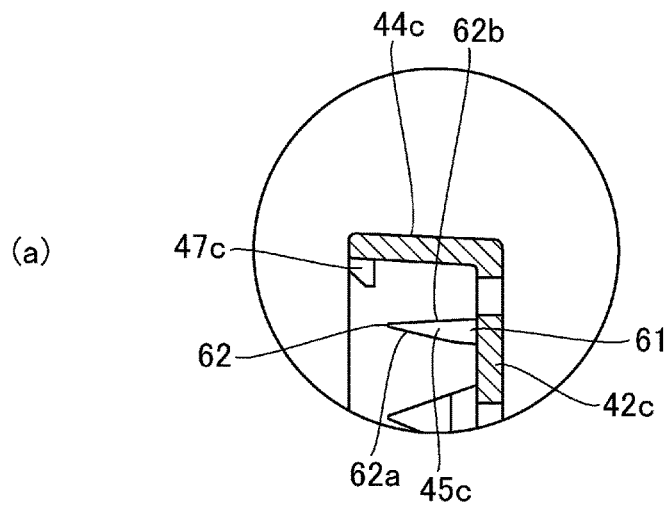
In FIG. 5, (a) to (c) are enlarged views, in which (a) shows a portion D of (d) of FIG. 2, (b) shows a portion E of FIG. 4, and (c) shows a portion F of (d) of FIG. 2.
Figure 5:
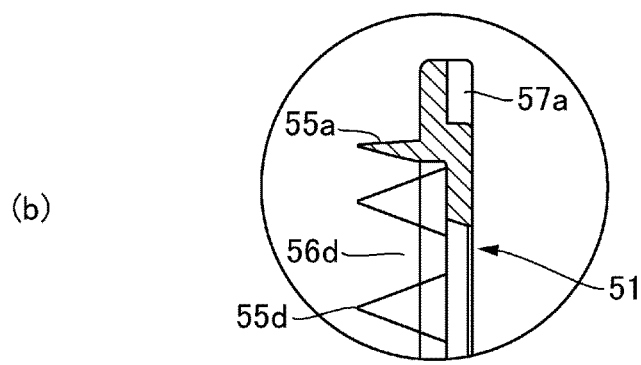
Figure 5:
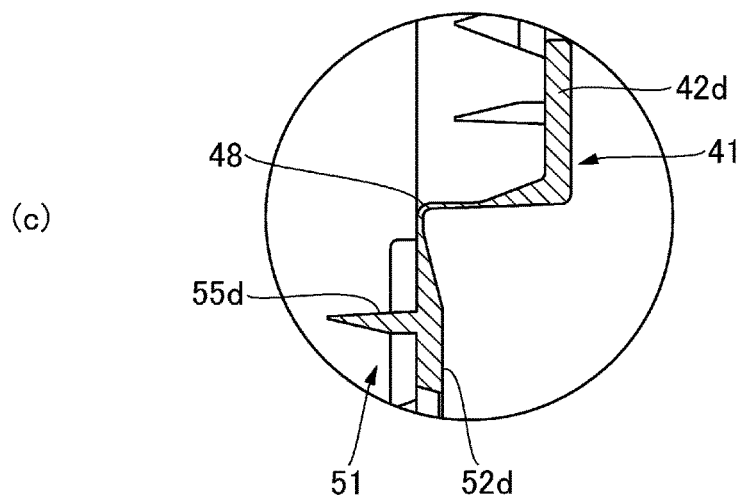

Further, in the case of this embodiment, the hinge portion 48 rotatably connecting the first frame portion 41 and the second frame portion 51 is constituted by thinning the connecting portion between the first frame portion 41 and the second frame portion 51 as shown in (c) of FIG. 5. For this reason, when the filter 31 is exchanged or mounted, even when the first frame portion 41 and the second frame portion 51 are rotated, the hinge portion 48 does not interfere with the gap-filling member 71. For this reason, it is possible to save the operator (user) the trouble of demounting and mounting the gap-filling member 71 during every exchanging or mounting operation of the filter 31.

Here, filter exchange operations in JP-A 2007-516829 and JP-A H11-63597 described above will be described. First, in the constitution of JP-A 2007-516829, when a demounting and exchanging operation of the contaminated filter 31 is performed, it takes much time. In the operation, cantilever supporting members which are provided with engaging holes at the base portion of the filter frame are disengaged from projections, for engagement, provided on the cover, one by one, so that the cover is opened. Then, a contaminated filter is taken out from the filter frame. Thereafter, a bellow-shaped pleated non-woven fabric filter is sandwiched so as to be fitted with uneven lateral ribs provided on the base portion. At that time, in the case of a filter subjected to a process such as melt flow, the filter has an elastic force even when the filter is pleated and thus is unstable until the filter is well fitted with the lateral ribs and then the cover is closed.

On the other hand, in a filter exchanging operation in the constitution of JP-A H11-63597, first, a new filter is placed on an extended filter frame. Then, an operation for engaging the filter frame with engaging claws by the frame is performed. Then, bending pieces provided with engaging holes are engaged with engaging projections, provided on the frame, through the engaging holes by folding back a hinge portion, so that the filter frame is assembled. However, during maintenance, the contaminated filter is removed (demounted). For this purpose, as in such a manner that the above-described operation is followed in reverse, such an operation that the plurality of engaging portions are engaged or disengaged one by one, and therefore the operator (user) takes trouble and time.

As described above, in the case of the constitutions of JP-A 2007-516829 and JP-A H11-63597, it takes trouble and time in the filter exchanging operation. On the other hand, in the case of this embodiment, as described above, the filter exchanging operation can be simply performed in a short time.

Specific Example

Next, a specific example of this embodiment described above will be described. First, problems of filter holding in constitutions which would be considered from the constitutions of JP-A 2007-516829 and JP-A H11-63597 and conventional constitutions will be organized. First, the filter of JP-A 2007-516829 is not pushed toward a lattice lateral rib side, but when the filter is pushed toward an opposite side, the filter is held with only a width of the edge and therefore the filter can pass through the edge and fall down. Further, there is such a problem that the lateral ribs exist on the entire surface in one side, and therefore, an opening area decreases correspondingly and thus pressure loss of the air passing through the filter becomes large, and therefore, efficiency lowers.

Further, the filter is pushed toward an opening side in a direction perpendicular to the surface thereof in some cases, or when air (wind) pressure of an air-blowing fan is applied, the filter can pass through the frame and fall down. When the filter falls down, there is a problem such that it causes spread of contaminants due to re-scattering of the collected matter and catch of the filter in the air-blowing fan.

Further, in the case of JP-A 2007-516829, depending on a material, a shape, a manufacturing method or the like of the filter, a fiber density and a thickness state of a layer vary, and when the filter is pressed in the frame by the thickness thereof, the frame is not readily closed due to a reaction force of the filter. On the other hand, a pressing area is increased with respect to a widthwise direction, there is a liability that the opening area decreases and thus a dust-collecting performance lowers.

On the other hand, in order to hold the nonwoven filter used in the above-described constitutions, it would be considered that projections provided on the filter frame are caused to penetrate and hold the filter. Particularly, in the case of filters subjected to processes, such as spunbonding and melt flow, which are fraying-preventing processing of fibers, the fibers bond together and therefore do not readily move. However, in some cases, holes are not readily bored in a filter material. Even when such a filter material is sandwiched forcedly by the filter frame, there is a problem such that the filter material passes through the gap (spacing) and thus cannot be held.

Further, when the holes are forcedly enlarged, there are problems such that the frame portions are damaged and that flexure generates due to deformation of a filter flat surface portion in a dish shape by stress of the holes. Accordingly, it would be considered that a processing step is increased by modifying a shape such that holes for penetration are bored in the filter in advance, but there is a liability that a manufacturing process becomes long, and in addition, a possibility of an occurrence of an operation error increases. Therefore, the present invention has been accomplished in view of the above-described problems. For example, the present invention solves the above-described problems without subjecting a filter, cut out from a flat nonwoven fabric of 2-5 mm in thickness into a rectangular portion, to a special boring.

Further, during use or mounting and demounting, even when the filter is inadvertently disengaged from the filter frame or an external force such as wind (air) pressure is applied to the filter, the filter is prevented from fall down from the filter frame by being flexed and expanded. Incidentally, as described above, in this embodiment, the filter frame 40 holding the filter can be opened at a touch, so that the filter exchanging operation can be easily performed.

In order to solve the above-described problems, in this embodiment, the shape of the pluralities of first projections 45a-45d and the pluralities of second projections 55a-55d is devised. Specifically, when these projections firmly bite the fibers of the nonwoven fabric filter, the filter does not readily pass through the filter frame. For this reason, in this embodiment, the outside side surfaces 62b of each of the projections are formed as substantially vertical surfaces, so that when the filter is once caught by the respective projections, a liability that the filter passes through the filter frame while sliding up along an inclined surface of each of the projections is minimized.

Further, in this embodiment, the filter frame 40 is formed by subjecting the resin material to molding with a metal mold. This metal mold is such a mold that the filter frame 40 in the state of FIG. 3 is sandwiched in a projection of each of the projections (hereinafter referred to as a vertical (up-down) direction), and one mold piece is pulled in the vertical direction relative to the other mold piece. For this reason, the outside side surface 62b has draft (angle). In general, the draft is about 1 degree, but accuracy of the metal mold was improved, so that the draft was 1/400 degree.

Incidentally, a free end of the outside side surface 62b of each of the projections may also be provided with an overhang such that the free end further projects toward the outside. In this embodiment, a hole is bored in the flat plate portion on which each of the projections is provided, so that the metal mold enters the outside side surface 62b side of each of the projections from the back surface side. Further, an edge of the outside side surface 62b is provided with a parting line of the metal mold and then the metal mold is parted and removed, whereby the outside side surface 62b can be overhanged so that the projections further bite into the fibers.

Further, in this embodiment, the outside side surface 62b of each of the projections is formed as a gently inclined surface. In this way, the outside side surface 62b is formed as the gently inclined surface, so that during resin (material) molding of each of the projections, a sufficient mechanical strength can be ensured while ensuring a sharp free end portion with respect to a filter falling down direction of each of the projections, and thus connection of the fibers at the filter surface is not readily broken.

Further, during mounting of the filter 31 into the filter frame 40, the filter 31 is prevented from flexing or expanding, so that a flat surface can be ensured. As a result, also from the viewpoint of a quality, a liability that the filter 31 falls down can be suppressed, and thus it becomes possible to provide a stably usable filter assembly 30.

Particularly, in this embodiment, shift between the fibers of the filter is minimized. That is, also in this embodiment, the filter 31 which has a stable fiber density is used. However, when a needle such as a pin of about 0.5 mm in diameter is intended to be pierced, the needle does not readily penetrate the filter 31. This is because the gaps (intervals) between the fibers are small and the fibers are fixed together and do not readily shift and therefore the needle is closely contacted to the fibers and thus does not readily penetrate the filter 31. On the other hand, as in the constitution of JP-A 2007-516829 and JP-A H11-63597, when the filter is only sandwiched by the flat surfaces, there is a possibility that the filter readily passes through the filter frame and falls down. Accordingly, in this embodiment, the respective projections are formed as described above, so that not only the shift between the frame portions of the filter is minimized but also the falling down of the filter is suppressed.

More specifically, in a use (operation) state of the image forming apparatus, the filter 31 is subjected to the wind pressure of the air-blowing fan for air supply and air discharge. For example, in the case where a rectangular axial fan having a rectangular size of about 80-100 mm, in general, with respect to the wind pressure, falling-down strength which is a force for holding (retaining) the filter by the filter frame requires about 200 g.

Here, as in the constitutions of JP-A 2007-516829 and JP-A H11-63597, the case where the filter is sandwiched by the flat surfaces will be verified. In verification, in a state in which the filter was mounted in the filter frame as in the constitutions of JP-A 2007-516829 and JP-A H11-63597, a normal force was applied to the filter surface by a tension gauge. Then, a load when the filter gradually shifted from the filter frame and disengaged from the filter frame, i.e., when an opening (hole) was generated by the falling down of the filter was measured. In the verification, it turned out that the filter falls down with a holding force (falling-down strength) of 50 g or less.

Therefore, the present inventors repeated a study on prevention of the falling down of the filter originally by sandwiching the filter by materials having various shapes, such as projections, ribs or the like having a conical shape, a columnar (cylindrical) shape, a pyramid-like quadrangular shape and the like. However, in all of the cases using the above-described shapes, it was difficult to clear a filter falling-down strength criterion of 200 g for holding the filter against the wind pressure. Particularly, as another method, it would be considered that the falling-down prevention of the filter can be achieved when the projected matter is pierced through the filter. However, as described above, the nonwoven fabric filter is processed by a fiber fixing means by which even the needle does not readily penetrate the filter, and therefore the projected manner cannot be penetrate the filter.

Therefore, as a result of further study, the projections having the above-described shape as described in this embodiment were employed. In this embodiment, it turned out that as regards the falling-down strength, even when a load of 500 g was applied, the filter did not fall down.

Further, although the thickness of the plate of the filter varies from 2 mm to 5 mm depending of uses of the filter, a condition for the case of the thickness of 2 mm which is thinnest and which are most liable to cause the falling down of the filter was estimated. As a result, a biting depth of each of the projections into the filter was about 1 mm, and in this case, the number of fibers capable of being caught by the projection was 80 fibers at the minimum. A tensile breaking strength of one projection was 15 g, and therefore the falling-down strength criterion of 200 g can be achieved by 14 projections.

Further, in order to ensure that the filter does not readily fall down, a measure to ensure the biting depth with reliability even when the filter shifts at either one of upper and lower portions was taken. That is, a constitution in which sharp projections are linearly disposed on every flat plate portion so that the projections alternately constitute peaks and valleys to bite into the filter was employed. Further, in order to achieve a target falling-down strength of 500 g or more, the number of the projections in line on one flat plate portion (in one side) was calculated and the projections were arranged correspondingly. In such a manner, in a state in which the projections having the shape in this embodiment were pressed against the filter surface and were caused to bite into the fibers of the filter to some extent, a critical (limit) load at which the fibers were broken was measured by the tension gauge. As a result, the falling-down strength of 500 g or more was obtained. Specifically, on each of the flat plate portions, 31 projections are provided and arranged in line, so that variation in quality and a safety factor are taken into consideration.

Further, in order to determine the height of each of the projections, it is required that a biting amount (depth) of each projection biting into the fibers of the filter is stabilized. In order to ensure the biting amount, the height of each projection was calculated, and a wavy height was determined as about 3.5 mm, so that the projections enter the fibers more deeply. As a result, by a bending force of the filter, the wind pressure of the air-blowing fan and the like, each of the projections further bites into the fibers of the filter every use.

Further, the gaps (intervals) between the projections provided at each of the first frame portion 41 and the second frame portion 51 were determined, so that it became possible to fix the filter 31 in the filter frame 40 without generating such a resisting force that the needle can penetrate the filter 31 with no obstacle to assembly. In this manner, when the projections were provided in the filter frame 40 in this embodiment, the falling-down strength of 750 g was achieved, so that it was possible to ensure a margin against the falling down of the filter 31.

Further, in this embodiment, different from the constitution of JP-A 2007-516829 in which the lateral ribs are provided on one surface of the filter frame, the opening area can be sufficiently ensured.

As described above, according to the constitution in this embodiment, it is possible to obtain the filter frame 40 and the filter assembly 30 which are capable of not only increasing (strengthening) the holding force of the filter 31 but also ensuring the opening area.

Further, conventionally, there was an integral-type filter constituted by subjecting a thin sheet(-like) filter to outsert molding with a resin material. In the case of this constitution, the used filter cannot be separated from the resin frame. On the other hand, in this embodiment, only the filter is removed (demounted) from the filter frame 40 and can be disposed of, and therefore, it became possible to provide the filter frame and the filter assembly which were further excellent in environment (aspect).

Further, when maintenance of the image forming apparatus was performed in a place of a market user (destination) where the image forming apparatus is used, conventionally, the resin integral-type filter was exchanged as a service part (component). On the other hand, in the case of this embodiment, only the filter alone can be exchanged, so that there is no need to ensure a space for carrying and transportation and the image forming apparatus is light in weight, and therefore it became possible to alleviate a load on maintenance.

Other Embodiments

In the above-described embodiment, an example in which the pluralities of first projections 45a-45d and the pluralities of second projections 55a-55b were alternately disposed with respect to the arrangement direction in a state in which the first frame portion 41 and the second frame portion 51 are combined so as to sandwich the filter 31 was described. However, in the present invention, a constitution in which the pluralities of first projections 45a-45d and the pluralities of second projections 55a-55d are not alternately disposed may also be employed. For example, a constitution in which a plurality (e.g., two) of first projections is continuously disposed and thereafter, a plurality of second projections is disposed with respect to the arrangement direction may also be employed. In summary, it is only required that there is a place where a plurality of second projections is disposed between a plurality of first projections.

Further, in the above-described embodiment, the first frame portion 41 and the second frame portion 51 are formed integrally with each other, but a constitution in which the first frame portion 41 and the second frame portion 51 are separated from each other may also be employed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-126339 filed on Jun. 24, 2015, which is hereby incorporated by reference herein in its entirety.

What is claimed is:

1. A frame for sandwiching and holding a filter, the frame comprising:
   a first frame portion provided with an opening for permitting passing of air, said first frame portion including a first plate portion which includes a plurality of sides surrounding the opening of said first frame portion;
   a second frame portion provided with an opening for permitting passing of air and configured to hold the filter between itself and said first frame portion, said second frame portion including a second plate portion which includes a plurality of sides surrounding the opening of said second frame portion;
   a plurality of first tapered projections provided on said first plate portion where the filter is mounted, and configured to project from said first plate portion so as to be disposed with intervals at an edge portion of said first plate portion, in a region where the filter is disposed; and
   a plurality of second tapered projections provided on said second plate portion where the filter is mounted, and configured to project from said second plate portion so as to be disposed with intervals at an edge portion of said second plate portion, in a region where the filter is disposed, wherein at least said first tapered projections are disposed so as to be sandwiched by said second tapered projections with respect to an arrangement direction of said first tapered portions,
   wherein, in a section in a plane perpendicular to the arrangement direction of said first tapered projections, shapes of at least one of said first tapered projections and said second tapered projections have first sides substantially perpendicular to a bottom of said at least one of said first tapered projections and said second tapered projections, and second sides inclined with respect to the bottom of said at least one of said first tapered projections and said second tapered projections, and
   wherein said plurality of first tapered projections are formed on all of the plurality of sides included in said first plate portion, and said plurality of second tapered projections are formed on all of the plurality of sides included in said second plate portion.

2. A frame according to claim 1, wherein when said first frame portion and said second frame portion are combined, said first tapered projections and said second tapered projections are alternately arranged in the arrangement direction of said first projections.

3. A frame according to claim 1, wherein said first tapered projections and said second tapered projections are formed integrally with said frame so as to project from said first flat plate portion and said second flat plate portion, respectively, and are provided at peripheries of said first frame portion and said second frame portion, respectively.

4. A frame according to claim 1, wherein said second side inclined with respect to the bottom of said at least one of said first tapered projections and said second tapered projections faces an inside of said frame.

5. A frame according to claim 1, wherein said first frame portion includes a hinge portion configured to fix said first frame portion rotatably relative to said second frame portion, and wherein at least one of said first frame portion and said second frame portion includes an engaging claw and the other one of said first frame portion and said second frame portion includes an engaging portion, with which said engaging claw is engageable, at a position where said engaging portion and said engaging claw fit together.

6. A frame according to claim 1, wherein each of said first frame portion and said second frame portion has a substantially rectangular shape, and wherein each of said pluralities of first and second tapered projections is formed at peripheral edge portions of the plurality of sides of said first plate portion and said second plate portion, respectively.

7. A frame according to claim 5, wherein each of said first frame portion and said second frame portion has a substantially rectangular shape, wherein at least two engaging claws are provided on peripheral edge portions of at least two sides of the plurality of sides of the one of said first frame portion and said second frame portion, each of the peripheral edge portions being continuous to an end of another peripheral edge portion in another side on which said hinge portion is formed, and wherein said frame includes a connecting portion configured to connect the peripheral edge portions of the at least two sides provided with said at least two engaging claws.

8. A filter assembly comprising:
a filter; and
a frame according to claim 1.

9. A filter assembly according to claim 8, wherein said filter is fibrous nonwoven fabric formed in a flat plate shape.

10. A frame according to claim 1, wherein said first sides and said second sides of said at least one of said first tapered projections and said second tapered projections oppose each other along the arrangement direction.

* * * * *